Jan. 1, 1924.
M. WALTHIER
CORN OR FERTILIZER SOWER MACHINE
Filed Sept. 25, 1922
1,480,801
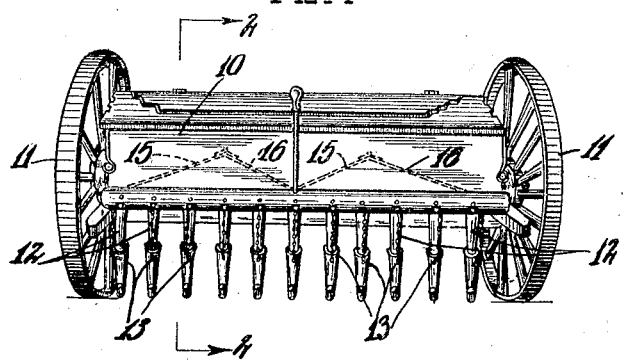
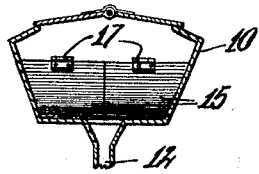
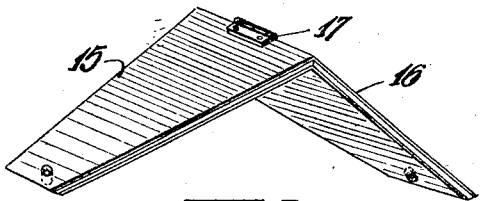
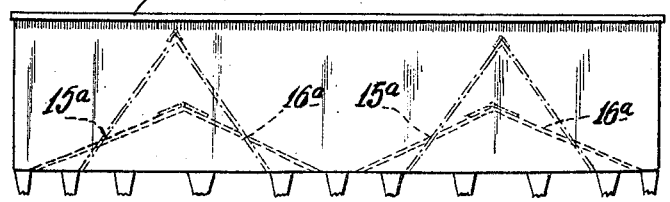
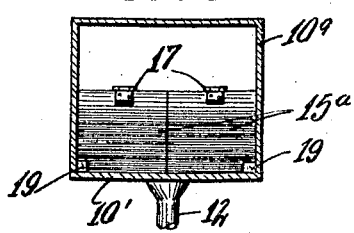
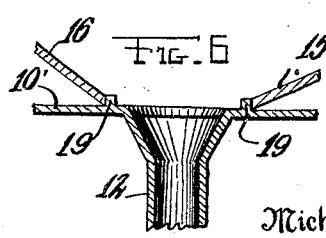
Inventor
Michael Walthier
By
Zoltan Polachek
Attorney Patented Jan. 15, 1924.

1,480,801

UNITED STATES PATENT OFFICE.

MICHAEL WALTHIER, OF CENTRAL BRIDGE, NEW YORK.

CORN OR FERTILIZER SOWER MACHINE.

Application filed September 25, 1922. Serial No. 590,256.

*To all whom it may concern:*

Be it known that I, MICHAEL WALTHIER, a citizen of the United States, residing at Central Bridge, in the county of Schoharie and State of New York, have invented certain new and useful Improvements in Corn or Fertilizer Sower Machines, of which the following is a specification.

This invention relates to corn or fertilizer sower machines, having particular reference to machines provided with a multiplicity of discharge chutes for the corn.

The invention has for an object to provide a novel and simple device permitting of the corn being directed through different sets of said discharge chutes, as may be desired.

For further comprehension of the invention, and of the objects and advantages thereof, reference will be had to the following description and accompanying drawing, and to the appended claims in which the various novel features of the invention are more particularly set forth.

Fig. 1 of the drawings is a perspective view, looking from the rear toward the front of a corn sower having the invention applied thereto.

Fig. 2 is a detail transverse view of the hopper, this view being taken on the line 2—2 of Fig. 1.

Fig. 3 is a detail perspective view of one of the corn directing members.

Fig. 4 is a similar view to Fig. 2 but showing a modified construction.

Fig. 5 is a rear view of the device shown in Fig. 4.

Fig. 6 is a fragmentary vertical sectional view showing the means for holding the corn directing elements in their inclined positions.

In the form of the device shown in Figs. 1 to 3 of the drawings I have shown the hopper of the corn sower at 10, this hopper being supported in the usual manner on a pair of wheels 11 and being in the form of an elongated box extending transversely between the wheels. Spaced along this hopper, and leading downward from the bottom thereof, is a series of delivery chutes 12 for the seed which are controlled by valves 13 in the usual manner.

Whereas, in sowing certain seed, it is desirable to use the full number of discharge chutes this is not always necessary or desirable and I have therefore provided means whereby the corn may be directed down certain selected ones of these chutes. This means comprises a plurality of boards, in this case four pairs, the respective boards of each pair being numbered 15 and 16 hinged together at adjacent ends as at 17.

These boards are fitted into the hopper 10 in the oblique position shown, inclining upwardly from their free ends toward their hinged ends. The boards rest in this position by engagement of their free ends with stop lugs 19 formed on the hopper bottom 10′ adjacent the respective chutes 12.

As will be apparent, these boards 15, 16 when in position cover the mouths of certain of the chutes 12 and direct the seed into the remaining chutes.

In connection with the type of hopper shown in Fig. 2 of the drawings and which has inclined side walls I may employ different sets of boards to direct the corn down different sets of chutes, but in connection with a hopper 10ª such as shown in Fig. 4 and which has vertical side walls, a single set of boards 15ª, 16ª, may be sufficient and these may be adjusted to different positions as indicated by the dotted lines, and dot and dash lines in Fig. 5.

By my invention I am enabled to broaden the range of operation of a corn sower, with a resultant economy to the farmer in equipment. The device may also be used to advantage as a distributor of fertilizing material.

It will be understood of course that various other changes and modifications might be made in the invention without departing from the spirit and scope of the invention. The longitudinal division of the grain directing elements shown in Figs. 2 and 4 might, for instance, be omitted with certain constructions of hopper.

Having thus described my invention what I claim as new and desire to protect by Letters Patent of the United States is as follows:

1. An elongated hopper having a series of delivery chutes spaced therealong, and a supplementary bottom member adjustably placed in said hopper and adapted to cover varying numbers of said chutes and to direct the material in the hopper into the other chutes.

2. An elongated hopper having a series of delivery chutes spaced therealong, and a supplementary bottom member adjustably placed in said hopper and adapted to cover varying numbers of said chutes and to direct the material in the hopper into the other chutes, said bottom member comprising a pair of boards inclining upwardly toward one another to a common apex.

3. An elongated hopper having a series of delivery chutes spaced therealong, and a series of boards arranged in pairs, the respective boards of each pair being hinged to one another and adapted to cover the mouths of certain ones of said discharge chutes, and stop lugs in the hopper adjacent the different chutes adapted to engage the opposed ends of the pairs of boards to hold the same in oblique position.

In testimony whereof I have affixed my signature.

MICHAEL WALTHIER.